United States Patent [19]

Demange

[11] Patent Number: 5,131,610
[45] Date of Patent: Jul. 21, 1992

[54] FRONT END STRUCTURE OF A BOOSTER ROCKET MOUNTED ON THE MAIN BODY OF A LAUNCHER

[75] Inventor: Claude Demange, Poissy, France

[73] Assignee: Aerospatiale Societe Nationale Industrielle, France

[21] Appl. No.: 726,573

[22] Filed: Jul. 8, 1991

[30] Foreign Application Priority Data

Jul. 11, 1990 [FR] France ............................... 90 08827

[51] Int. Cl.$^5$ ................................................ B65G 1/40
[52] U.S. Cl. .................................. 244/158 R; 244/54; 244/172
[58] Field of Search ....................... 244/54, 55, 58, 130, 244/172, 158 R, 160, 74; 102/374, 376, 377, 378; 60/39, 31, 263, 253

[56] References Cited

U.S. PATENT DOCUMENTS 2,960,034 11/1960 Besserer ................................. 102/49
4,452,412 6/1984 von Pragenau .

FOREIGN PATENT DOCUMENTS 763292 7/1967 Canada ................................. 244/160
3211873 11/1983 Fed. Rep. of Germany .
696751 9/1953 United Kingdom .

OTHER PUBLICATIONS

Semenov "Together to Mars: A proposal" *Final Frontier*, p. 10, May/Jun. 1990.

*Primary Examiner*—Galen Barefoot
*Attorney, Agent, or Firm*—Hayes, Soloway, Hennessey & Hage

[57] ABSTRACT

A front end structure of a booster rocket for a launcher is disclosed. The front end structure comprises a curved support arm mechanically connecting a front fastening device to the front end of the booster rocket, and an aerodynamic protection cover mounted onto the front end of the booster rocket and surrounding the support arm without being rigidly mechanically connected to the support arm.

21 Claims, 2 Drawing Sheets

FRONT END STRUCTURE OF A BOOSTER ROCKET MOUNTED ON THE MAIN BODY OF A LAUNCHER

FIELD OF THE INVENTION

The invention relates to a front end structure of a booster rocket, e.g. a powder rocket, to be fitted laterally to the main body of a launcher.

BACKGROUND OF THE INVENTION

As is very diagrammatically shown in the left-hand half of FIG. 1, in order to install booster rockets 10 laterally on the main body 20 of a launcher, user is conventionally made of two connections 21, 22, which are respectively located to the rear and to the front of each of the booster rockets. These connections must transmit to the main launcher body the static forces constituted by the thrust forces produced by the booster rockets, whilst avoiding transmitting dynamic forces corresponding to the vibrations of the booster rockets and allowing the separation and jettisoning of the latter when their action is at an end. The connections must also take account of the differential expansions occurring between the main launcher body and the booster rockets during the operation of the latter.

In practice these different functions are fulfilled by linking the rear of each of the booster rockets 10 to the main launcher body 20 by a rigid fastening device 21 e.g. incorporating a system of rods and by connecting the front of each booster rocket to the main launcher body by a ball joint attachment device 22, which takes up the thrust force.

More specifically, the front end structure 12 by which the envelope of the tank of each of the booster rockets 10 is connected to the main launcher body 20 through the front fastening device 22, comprises a cylinder 14 obliquely cut on its front face and a cone 16 extending said front face of the cylinder and terminated by a spherical cap 18. The axis of the cone 16 is e.g. inclined by approximately 12° towards the main launcher body with respect to the booster rocket axis. With the exception of the spherical cap 18, the front end structure 12 is entirely of metal and also has a very complex construction. Thus, it has a single skin of varying thickness in its front part, two skins connected by stiffeners in its rear part and stiffening frames are incorporated into it to improve its rigidity.

The heavy and particularly complex character of the front structure 12 used at present is more particularly due to the fact that it must have a high rigidity in three axes due to the dynamics of the overall launcher. It must also be able to withstand the aerodynamic loads applied to it during flight and the mechanical load resulting from the transmission of the thrust force between the launcher body 20 and the booster rocket 10 across the front fastening device 22. The over dimensioning of the front end structure 22 as a result of all these considerations leads to an increase in the weight of the overall launcher, which considerably reduces the payload which the latter can carry. Moreover, any modification to the characteristics of the booster rockets makes it necessary to completely recalculate or redesign the front end structure 12.

SUMMARY OF THE INVENTION

The present invention specifically relates to a front end structure of a booster rocket, whose novel and original design makes it possible to reduce the weight of said structure, which makes it possible to increase the payload carried by the launcher. In addition, said novel end structure can be more easily modified than the existing structure in the case of a change to the characteristics of the booster rocket.

According to the invention this result is obtained by means of a booster rocket front end structure which can be connected to the main body of a launcher by a font fastening device characterized in that it has a curved support arm mechanically connecting the front fastening device to the front end of the booster rocket and an aerodynamic protection cover fixed to the front end of the booster rocket and surrounding the curved support arm, without any rigid mechanical connection to the latter.

In the thus defined structure, the aerodynamic and thermal loads are completely supported by the protective cover, whilst the mechanical load is completely supported by the curved support arm. The separation of these functions makes it possible to simplify the structure and reduce its weight, so that the payload carried by the launcher can be increased. Moreover, in the case of a change of booster rocket characteristics, the modifications to be made to the structure are greatly simplified compared with existing structures.

In a preferred embodiment of the invention, the curved support arm has an inwardly curved axis of inertia, whereof a first end is perpendicular to the surface of the main body and whereof the second end is tangential to an axis of inertia of the booster rocket, the curved support arm having a circular section centered on its axis of inertia and whose diameter progressively increases from the first end to the second end.

Advantageously, the diameter of the second end of the curved support arm is substantially equal to half the diameter of the booster rocket, a cylindroconical connecting skirt linking said second end to the front end of the booster rocket.

This cylindroconical linking skirt can be made from a light metallic alloy, whereas the curved support arm, which is preferably hollow and has reinforcing frames distributed over its entire length, is advantageously made from a composite material.

In order to ensure the independence between the cover and the curved support arm, the end of the latter adjacent to the launcher traverses the protective cover via a flexible gasket or seal.

BRIEF DESCRIPTION OF THE DRAWINGS

A preferred embodiment of the invention will now be descried with reference to the attached drawings, wherein show.

DETAILED DESCRIPTION OF PREFERRED EMBODIMENT

Figure 1:
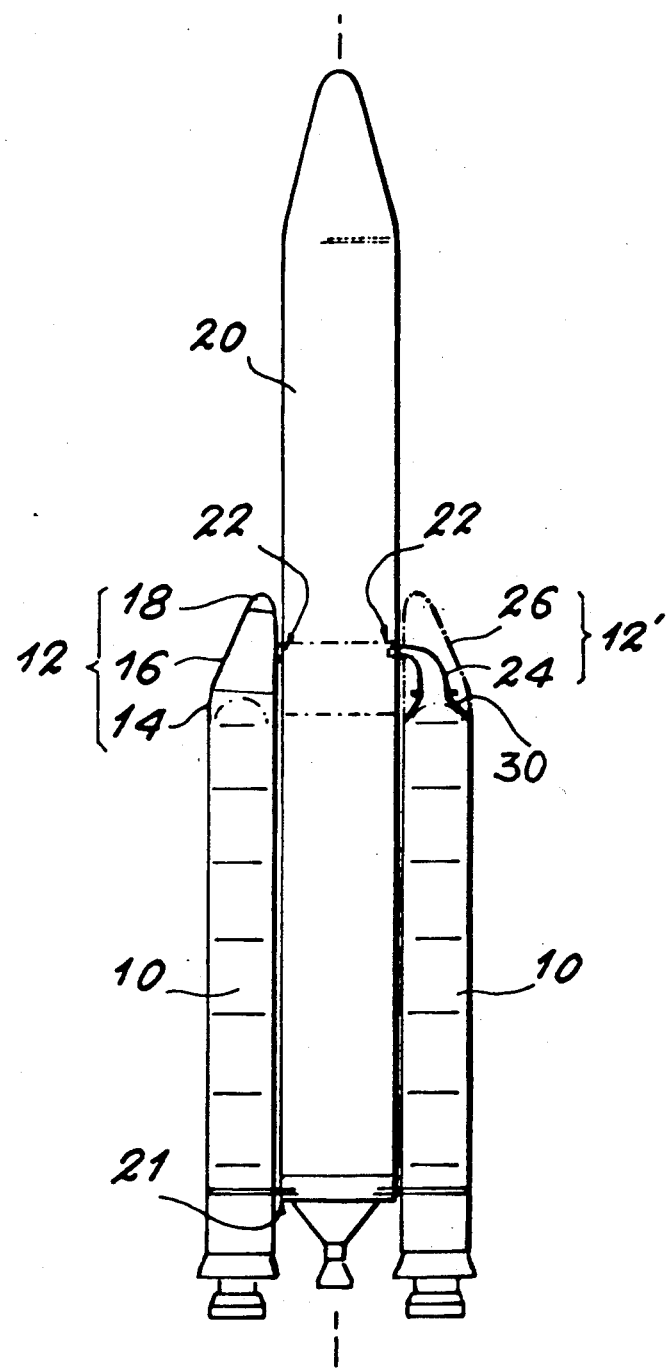
FIG. 1 A diagrammatic view showing a launcher equipped with two booster rockets, the rocket illustrated to the left of the drawing having a front end structure according to the prior art, whereas that illustrated to the right has a front end structure according to the invention.

As is very diagrammatically shown to the right in FIG. 1, a booster rocket 10 such as a powder rocket mounted on the main body 20 of a launcher is equipped, according to the invention, with a front end structure 12' comprising a curved support arm 24 and an aerodynamic protective cover 26. The support arm 24 is extended on the side of the booster rocket 10 by a cylindroconical skirt 30.

The curved support arm 24 and the cylindroconical skirt 30 ensure the mechanical connection between the envelope 36 (FIG. 2) of the tank of the booster rocket 10 and the main launcher body 20 via the front fastening device 22 of said booster rocket. It consequently transmits mechanical forces due to the thrust of the booster rocket 10 between the latter and the main launcher body 20.

The aerodynamic protective cover 26 is fixed to the envelope 36 (FIG. 2) of the tank of the booster rocket 10 and is located around the curved support arm 24 without any rigid mechanical connection to the latter, so as to withstand the aerodynamic and thermal forces produced during flight.

Figure 2:
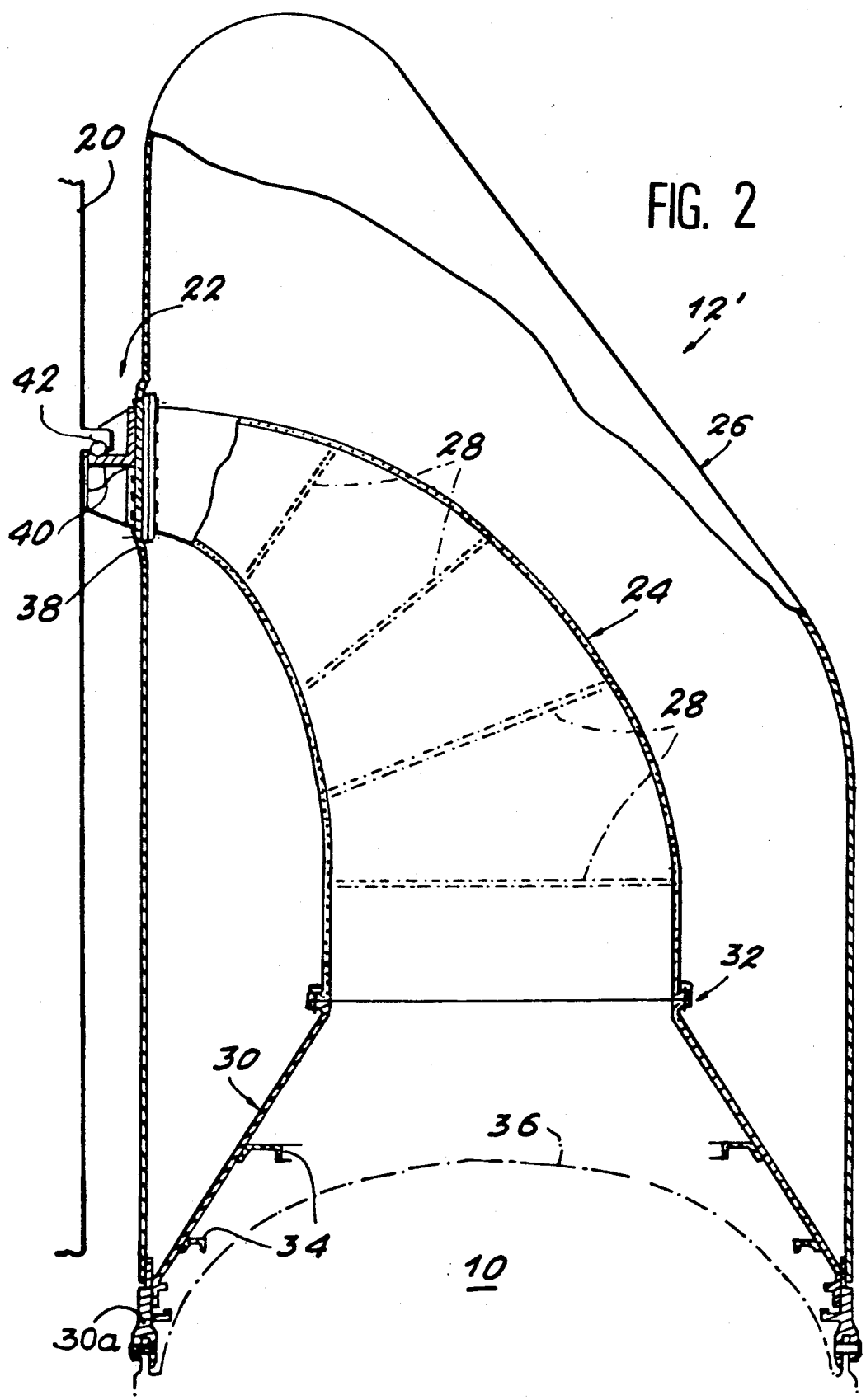
FIG. 2 A part sectional view showing on a larger scale the front end structure according to the invention.

As is more particularly illustrated in FIG. 2, the curved support arm 24 is constituted by a hollow beam, which has an inwardly curved axis of inertia, whereof a first end, connected to the main launcher body 20 by the front fastening device 22, is perpendicular to the surface of the main launcher body 20. The second end of the axis of inertia of the support arm 24 and which is fixed to the booster rocket tank envelope 36 is tangential to the axis of inertia of the booster rocket 10.

Moreover, the curved support arm 24 has a circular section centered on its inwardly curved axis of inertia and whose diameter increases progressively from its first end linked to the main launcher body 20 to its second end fixed to the envelope 36. The said form given to the support arm 24 makes it possible to progressively transform the shear stresses due to the force exerted between the booster rocket and the main launcher body during the operation of the said rocket, into bending stresses and then into compressive and bending stresses.

The curved support arm 24 is advantageously made from a composite material, e.g. formed by carbon fibers embedded in a resin. In the embodiment illustrated in FIG. 2, said structure is reinforced by reinforcing frames 28 distributed over its entire length.

The largest diameter end of the curved support arm 24 has a diameter, which is advantageously equal to approximately half the diameter of the tank of the booster rocket 10. Moreover, said end is connected to the envelope of the tank of the booster rocket 10 by the cylindroconical linking skirt 30. The connection between the curved support arm 24 and the cylindroconical skirt 30 is ensured by bolted flanges, as illustrated at 32 in FIG. 2. The skirt 30 can be made from a light metallic alloy and, like the curved support arm 24, is internally reinforced by frames 34.

The diameter of the cylindroconical skirt 30 increases from the curved support arm 24 to the envelope 36 of the tank of the booster rocket 10, to the periphery of which is fixed a cylindrical part 30a of the skirt 30, e.g. using pins. This arrangement makes it possible to free the space occupied by the front base of the tank of the booster rocket 10.

As is illustrated in FIG. 2, the aerodynamic protective cover 26 is also fixed to the cylindrical part 30a of the cylindroconical skirt 30, e.g. By rivets. The shape of the aerodynamic protective cover 26 is determined in a conventional manner as a function of its aerodynamic behavior during flight. It can in particular have a cylindrical rear part and a conical front part, with an axis inclined by approximately 12° towards the main launcher body 20, the front end of the cover being closed by a spherical cap. The cover 26 completely surrounds the curved support arm 24 and the cylindroconical skirt 30, with the exception of the support arm end fixed by the front fastening device 22 to main launcher body 20. This end of the support arm 24 traverse the cover 26 via a flexible joint or seal 38. This configuration makes it possible to eliminate any rigid mechanical connection between the curved support arm 24 and the cover 26, which ensures the mechanical independence of the these two parts.

As is very diagrammatically shown in FIG. 2, the end of the curved arm support 24 adjacent to the main launcher body 20 carries a fitting 40 with which operates a ball joint 42 connected to the main body 20, in order to form the front fastening device 22. The latter has a conventional structure and does not form part of the invention.

The aerodynamic protective cover 26 can advantageously be made from a composite material based on Kevlar (registered trade mark) fibers. In the end structure of the booster rocket 10 according to the invention, the cover 26 support or withstands the aerodynamic forces exerted on the structure during launcher flight, whereas the curved support arm 24 and the cylindroconical skirt 30 withstand the mechanical forces due to the thrust of the booster rocket 10. In view of the fact that they are covered by the cover 26, the support arm 24 and the skirt 30 are protected from thermal effects in flight. Thus, there is no reduction in their mechanical strength with temperature.

This separation of the functions makes it possible to simplify the structure and therefore reduce its weight. Therefore the payload carried by the launcher can be increased.

In the case where developments to the booster rocket structure require modifications to the end structure of said rocket, the novel concept according to the invention makes it possible to act more easily, because the different elements of said structure are separate. For example, the conical shape of the cover can be changed to an ogival or other shape, without the shape and dimensions of the curved support arm being modified. In addition, the separation between the functions makes it possible to make the curved support arm and the cylindroconical skirt insensitive to fluctuation to the aerodynamic forces and to their moment, which for them leads to less vibrations.

Moreover, the deformations of the cover due to aerodynamic forces are not added to the deformations of the support arm and the cylindroconical skirt, measured level with the front fastening device 22 and which hare due to the thrust of the powder rocket, which gives the structure according to the invention an overall higher rigidity than the existing structure.

Obviously, the invention is not limited to the embodiment described in exemplified manner hereinafter and in fact covers all variants thereof. Thus, as has been shown, the shape given to the cover can be modified without passing beyond the scope of the invention. This also applies with respect to the dimensions of the curved support arm, which can modified as a function of the forces to be transmitted. Moreover, although the support arm is advantageously made from a composite material, in certain cases it can be made from a composite material. If necessary, the rigidity of the curved support arm 24 can be reinforced, e.g. by axial stiffeners or a core or web. In the same way, the rigidity of the cylindroconical skirt can be reinforced by axial stiffeners having an omega-shaped cross-section.

I claim:

1. A front end structure of a booster rocket, for connecting to the main body of a launcher by a front fastening device, and comprising, an arc-shaped support arm for mechanically connecting the front fastening device to the front end of the booster rocket, and an aerodynamic protective cover fixed to the front end of the booster rocket and surrounding the arc-shaped support arm without any rigid mechanical connection to the latter.

2. A structure according to claim 1, wherein the arc-shaped support arm has an inwardly curved axis of inertia, said arm having a first end which is perpendicular to the surface of the main launcher body and a second end which is tangential to an axis of inertia of the booster rocket, the curved support arm having a circular section centered on its axis of inertia and a diameter that progressively increases from the first end to the second end.

3. A structure according to claim 2 wherein the diameter of the second end of the arc-shaped support arm is substantially equal to half the diameter of the booster rocket, and further comprising a cylindroconical linking skirt connecting said second end to the front of the booster rocket.

4. A structure according to claim 3, wherein the cylindroconical linking skirt is made from a light metallic alloy.

5. A structure according to claim 3, wherein the cylindroconical linking skirt is made from a composite material.

6. A structure according to claim 1, wherein the arc-shaped support arm is made from a composite material.

7. A structure according to claim 1, wherein the end of the curved support arm adjacent to the launcher traverses the protective cover via a flexible seal.

8. A structure according to claim 1, wherein the arc-shaped support arm is hollow and has a plurality of reinforcing frames distributed along its entire length.

9. A front end structure of a booster rocket, for connection to the main body of a launcher by a front fastening device and comprising a curved support arm for mechanically connecting the front fastening device to the front end of the booster rocket, said curved support arm having an inwardly curved axis of inertia, and having a first end which is perpendicular to the surface of the main launcher body and whose second end which is tangential to an axis of inertia of the booster rocket, the curved support arm having a circular section centered on its axis of inertia and a diameter that progressively increases from the first end to the second end, and an aerodynamic protective cover fixed to the front end of the booster rocket surrounding the curved support arm, without any rigid mechanical connection to the latter.

10. A structure according to claim 9, wherein the diameter of the second end of the curved support arm is substantially equal to half the diameter of the booster rocket, and further comprising a cylindroconical linking skirt connecting said second end to the front end of the booster rocket.

11. A structure according to claim 10, wherein the cylindroconical linking skirt is made from a light metallic alloy.

12. A structure according to claim 10, wherein the cylindroconical linking skirt is made from a composite material.

13. A structure according to claim 9, wherein the curved support arm is made from a composite material.

14. A structure according to claim 9, wherein the end of the curved support arm adjacent to the launcher traverses the protective cover via a flexible seal.

15. A structure according to claim 9, wherein the curved support arm is hollow and has a plurality of reinforcing frames distributed along its entire length.

16. A structure according to claim 9, wherein said cover is conically shaped.

17. A structure according to claim 9, wherein said cover is ogivally shaped.

18. A structure according to claim 10, wherein said skirt includes a plurality of axial stiffening elements having omega-shaped cross-sections.

19. A structure according to claim 1, wherein said cover is conically shaped.

20. A structure according to claim 11, wherein said cover is ogivally shaped.

21. A structure according to claim 2, wherein said skirt includes a plurality of axial stiffening elements having omega-shaped cross-sections.

* * * * *

UNITED STATES PATENT AND TRADEMARK OFFICE
CERTIFICATE OF CORRECTION

PATENT NO. : 5,131,610

DATED : JULY 21, 1992

INVENTOR(S) : CLAUDE DEMANGE

It is certified that error appears in the above-identified patent and that said Letters Patent is hereby corrected as shown below:

"Claim 3, col. 5, line 28, after "front", insert "end"."

Signed and Sealed this

Twenty-eighth Day of September, 1993

Attest:

BRUCE LEHMAN

Attesting Officer

Commissioner of Patents and Trademarks